US011831996B2

(12) United States Patent
Maekelae et al.

(10) Patent No.: US 11,831,996 B2
(45) Date of Patent: Nov. 28, 2023

(54) HIGH DYNAMIC RANGE IMAGE ACQUISITION USING TEMPORAL FILTERING (71) Applicant: Microsoft Technology Licensing, LLC, Redmond, WA (US)

(72) Inventors: Christian Markus Maekelae, Redmond, WA (US); Michael Bleyer, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/590,641

(22) Filed: Feb. 1, 2022

(65) Prior Publication Data

US 2023/0188862 A1    Jun. 15, 2023

Related U.S. Application Data (60) Provisional application No. 63/288,416, filed on Dec. 10, 2021.

(51) Int. Cl.
*H04N 23/741* (2023.01)
*H04N 23/72* (2023.01)

(52) U.S. Cl.
CPC ........... *H04N 23/741* (2023.01); *H04N 23/72* (2023.01)

(58) Field of Classification Search
CPC ........................... H04N 23/741; H04N 23/72
See application file for complete search history.

(56) References Cited

U.S. PATENT DOCUMENTS

| 11,189,017 | B1 | 11/2021 | Baqai et al. | |
|---|---|---|---|---|
| 2008/0284872 | A1* | 11/2008 | Asoma | H04N 23/70 348/E5.04 |
| 2011/0254976 | A1* | 10/2011 | Garten | G09G 5/14 348/E5.037 |
| 2020/0267300 | A1 | 8/2020 | Zhen et al. | |

FOREIGN PATENT DOCUMENTS

EP    3076364 A1    10/2016

OTHER PUBLICATIONS

"Application as Filed in U.S. Appl. No. 17/524,274", filed Nov. 11, 2021, 51 Pages.
"International Search Report and Written Opinion Issued in PCT Application No. PCT/US22/042582", dated Dec. 12, 2022, 11 Pages. (MS# 410923-WO-PCT).

* cited by examiner

*Primary Examiner* — Ahmed A Berhan
(74) *Attorney, Agent, or Firm* — WORKMAN NYDEGGER (57) ABSTRACT A system for generating high dynamic range (HDR) imagery obtains a history frame associated with a first timepoint and with a first set of image capture parameters. The system obtains an image frame associated with a particular set of image capture parameters and captured at a second timepoint that is subsequent to the first timepoint, and the particular set of image capture parameters comprises the first set of image capture parameters or a second set of image capture parameters. The system generates a normalized image frame by applying a normalization operation to the image frame. The normalization operation may be determined based upon the particular set of image capture parameters. The system generates a weight map based upon at least the normalized image frame and generate an HDR image frame based upon the normalized image frame, the history frame, and the weight map.

20 Claims, 6 Drawing Sheets

HIGH DYNAMIC RANGE IMAGE ACQUISITION USING TEMPORAL FILTERING

CROSS-REFERENCE TO RELATED APPLICATIONS

This application claims priority to U.S. Provisional Patent Application Ser. No. 63/288,416, filed Dec. 10, 2021, and titled "HIGH DYNAMIC RANGE IMAGE ACQUISITION USING TEMPORAL FILTERING", the entirety of which is incorporated herein by this reference.

BACKGROUND

High dynamic range (HDR) imaging was developed in an effort to improve images of captured environments that include both brightly illuminated areas/objects and relatively darker areas/objects. As a simple and brief introduction, conventional HDR imaging involves capturing at least two separate images. One image is generated using a prolonged exposure time to detect enough photons to capture the dark, shadowy areas/objects within a captured environment. The other image uses a very short exposure time to detect photons for capturing the brightly lit areas/objects while avoiding oversaturation. Under conventional techniques, these two images are then blended/stitched together via signal/image processing to generate a composite image that shows objects in the bright areas (as opposed to simply a washed-out white blur) as well as objects in the dark areas (as opposed to simply a dark blur), effectively increasing the dynamic range of the combined images.

While traditional HDR sensors can provide accurate and highly dynamic images for static environments, serious problems arise when HDR sensors are used to generate images of environments that include moving objects in the scene (or where the image sensor is moving relative to the scene). To illustrate, the long-exposure image and the short-exposure image used to form an HDR image are typically captured at different times (i.e., one after the other). Thus, when relative motion is present between the image sensor and the captured environment, the objects captured in the long-exposure image can become spatially misaligned with the same objects captured in the short-exposure image. This misalignment can result in blurring artifacts that reduce image quality and/or intelligibility. In addition, the lengthy exposure time used to capture the long-exposure image can further contribute to the motion blur present in the final image.

Furthermore, because conventional approaches involve performing multiple exposures to capture multiple images to form a single HDR image, the rate at which HDR images can be formed is typically lower than the image capture rate. Such constraints limit the applicability of HDR imaging for various endeavors, such as video capture.

Thus, for at least the foregoing reasons, there is an ongoing need and desire for improved systems and techniques for HDR image acquisition.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed at least to systems, methods, and devices for facilitating high dynamic range image acquisition using temporal filtering.

Some embodiments include a system for generating high dynamic range (HDR) imagery. The system includes one or more processors and one or more hardware storage devices storing instructions that are executable by the one or more processors to configure the system to perform various acts. In some implementations, the system is configurable to obtain a history frame. The history frame is associated with a first timepoint and with a first set of image capture parameters. The system is also configurable to obtain an image frame associated with a particular set of image capture parameters. The image frame is captured at a second timepoint that is subsequent to the first timepoint, and the particular set of image capture parameters comprises the first set of image capture parameters or a second set of image capture parameters. The system is also configurable to generate a normalized image frame by applying a normalization operation to the image frame. The normalization operation may be determined based upon the particular set of image capture parameters. The system is further configurable to generate a weight map based upon at least the normalized image frame and generate an HDR image frame based upon the normalized image frame, the history frame, and the weight map.

Some embodiments include a system for generating a weight map. The system includes one or more processors and one or more hardware storage devices storing instructions that are executable by the one or more processors to configure the system to perform various acts. In some implementations, the system is configurable to generate a global weight map based on motion data associated with the system and generate a local weight map based upon a difference image. The difference image may be based upon a motion compensated history frame associated with a first timepoint and (i) an image frame associated with a particular set of image capture parameters and captured at a second timepoint that is subsequent to the first timepoint or (ii) a normalized image frame generated by applying a normalization operation to the image frame. The system is also configurable to generate a local high dynamic range (HDR) weight map based upon the image frame, the normalized image frame, a denoised image frame, or a denoised normalized image frame. The system is further configurable to generate a final weight map by combining the global weight map, the local weight map, and the local HDR weight map.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are generally directed to systems, methods, and devices that facilitate high dynamic range (HDR) image acquisition using temporal filtering.

Examples of Technical Benefits, Improvements, and Practical Applications

Those skilled in the art will recognize, in view of the present disclosure, that at least some of the disclosed embodiments may be implemented to address various shortcomings associated with at least some conventional techniques and/or systems for HDR image acquisition. The following section outlines some example improvements and/or practical applications provided by the disclosed embodiments. It will be appreciated, however, that the following are examples only and that the embodiments described herein are in no way limited to the example improvements discussed herein.

In accordance with the present disclosure, HDR image acquisition utilizing temporal filtering may comprise obtaining a history frame associated with a first timepoint. The history frame may comprise a previously generated HDR image frame that was generated in accordance with the steps that follow (or an intermediate result used to generate the previously generated HDR image frame).

Separate from the history frame, an image frame associated with a second, subsequent timepoint may be obtained (e.g., captured utilizing an image sensor, which may be the same image sensor used to capture a previous image frame used to generate the history frame). The image frame is associated with a particular set of image capture parameters (e.g., a particular exposure time and/or gain parameters), which may be the same as or different than image capture parameters used to capture a previous image used to generate the history frame.

A normalization operation may then be applied to the image frame to generate a normalized image frame. The normalization operation may be selected based on the particular image capture parameters for capturing the image frame. The normalization operation may cause pixel values of the normalized image frame to be within the same range as pixel values of the history frame.

A weight map may be generated using (at least) the normalized image frame. A weight map may include a local HDR weight component, where per-pixel weights may be determined based on the intensity values present in the input image (e.g., the normalized image frame, or, in some instances, a different image frame, as will be described in more detail hereinafter). The per-pixel weights may be determined based on predefined rules, such as threshold values and/or threshold ranges of values, and the predefined rules applied for generating the per-pixel weights may be selected based on the image capture parameters used to capture the image frame. For instance, when a short exposure time is used to capture the image frame, the predefined rules may cause greater weight to be assigned to higher-intensity pixels, which may include texture information for objects that would appear saturated if a long exposure time was used to capture the image frame. Correspondingly, if a long exposure is used to capture the image frame, the predefined rules may cause greater weight to be assigned to lower-intensity pixels, which may include texture information for objects that would appear underexposed if a short exposure time was used to capture the image frame.

An HDR image frame may be generated based upon the normalized image frame, the history frame, and the weight map. The HDR image frame may then be defined as a history frame that can be used in combination with a subsequently captured image frame to generate a subsequent HDR image frame.

The techniques discussed above and elsewhere herein for generating an HDR image frame may be performed repeatedly to advantageously cause an image capture rate to match an HDR image acquisition/generation rate, thereby providing a desirable approach for generating/capturing high-framerate HDR video.

In some implementations, the history frame used to generate the HDR image is a motion compensated history frame. Furthermore, in some implementations, the weight map further includes an intensity similarity component (e.g., based on a comparison between intensities of temporally consecutive frames, where dissimilarity between pixel intensities leads to lower weight) and/or a global weight component (e.g., based on camera motion across timepoints, where history frame weighting is reduced if high camera motion is detected). Such features may facilitate reduced temporal ghosting and/or other motion artifacts present in the HDR imagery.

The disclosed techniques for HDR image acquisition naturally implement temporal averaging (e.g., by utilizing a history frame in combination with a current image frame to generate a current HDR image frame), which may improve the signal-to-noise ratio for HDR imagery. The disclosed techniques may be implemented utilizing any suitable type of image sensor (e.g., CMOS, CCD, SPAD, etc.).

Having just described some of the various high-level features and benefits of the disclosed embodiments, attention will now be directed to FIGS. 1 through 4. These Figures illustrate various conceptual representations, architectures, methods, and supporting illustrations related to the disclosed embodiments.

Figure 1:
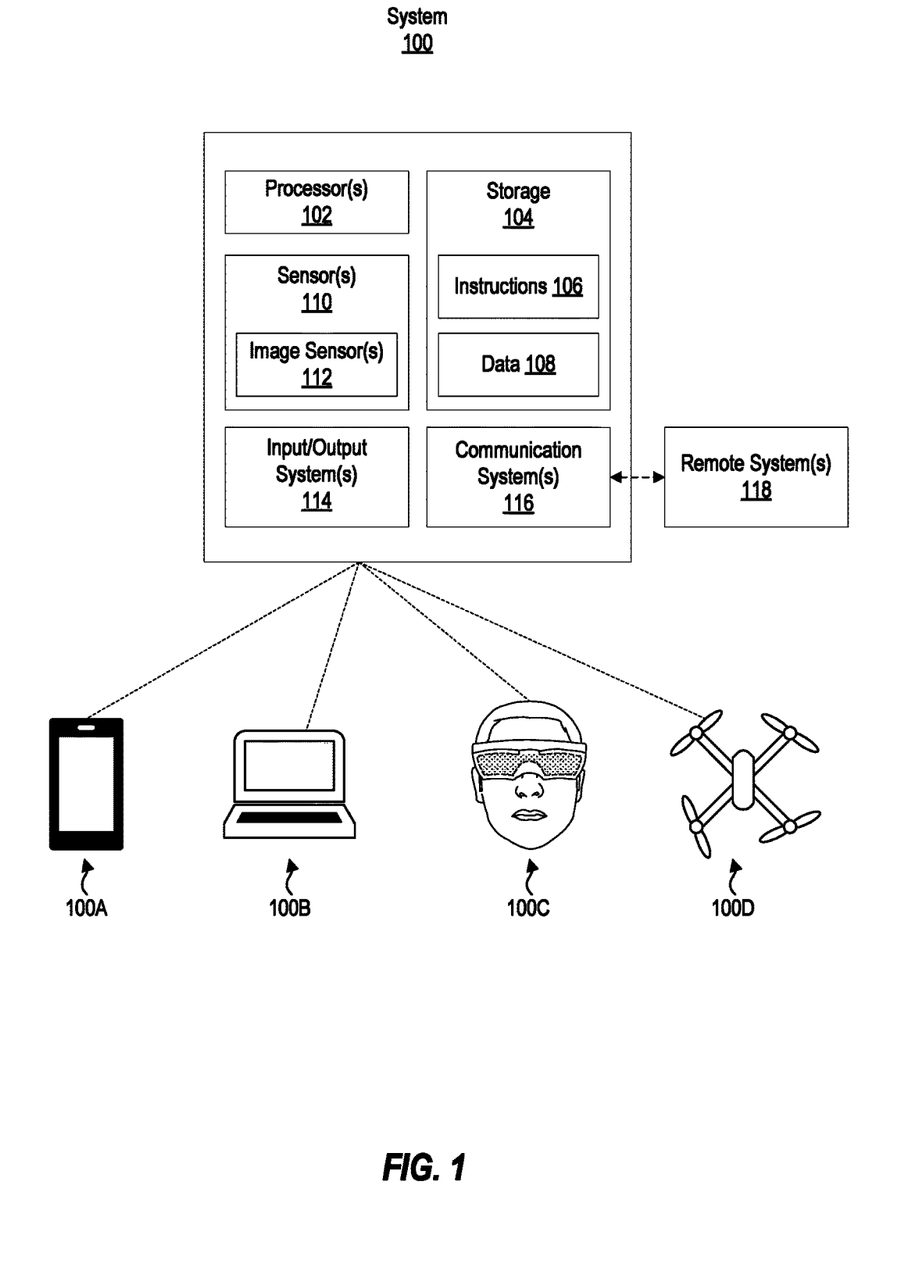
FIG. 1 illustrates example components of an example system that may include or be used to implement one or more disclosed embodiments.

Example Systems and Techniques for HDR Image Acquisition Using Temporal Filtering FIG. 1 illustrates various example components of a system 100 that may be used to implement one or more disclosed embodiments. For example, FIG. 1 illustrates that a system 100 may include processor(s) 102, storage 104, sensor(s) 110, image sensor(s) 112, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 118 may comprise any combination of software or hardware components that are operable to facilitate communication between on-system components/devices and/or with off-system components/devices. For example, the communications system(s) 118 may comprise ports, buses, or other physical connection apparatuses for communicating with other devices/components. Additionally, or alternatively, the communications system(s) 118 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensor(s) 112 (e.g., CMOS, CCD, SPAD, and/or others), microphones, thermometers, barometers, magnetometers, accelerometers, gyroscopes, inertial measurement units (IMUS) and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. Although the present description focuses, in at least some respects, on utilizing an HMD to implement techniques of the present disclosure, additional or alternative types of systems may be used.

Figure 2A:
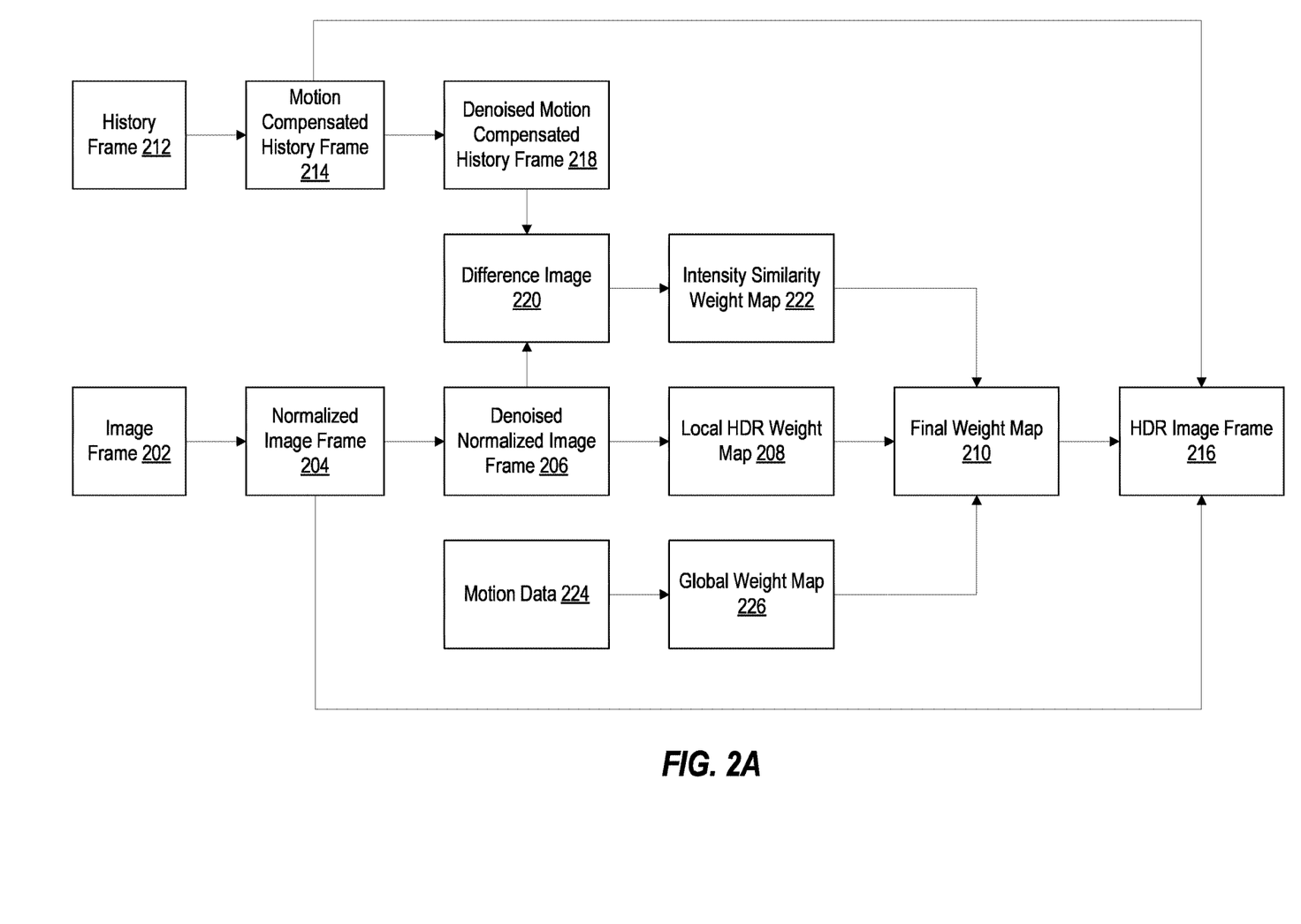
FIGS. 2A through 2C illustrate example image processing flow diagrams depicting image processing associated with HDR image acquisition using temporal filtering.
Figure 2B:
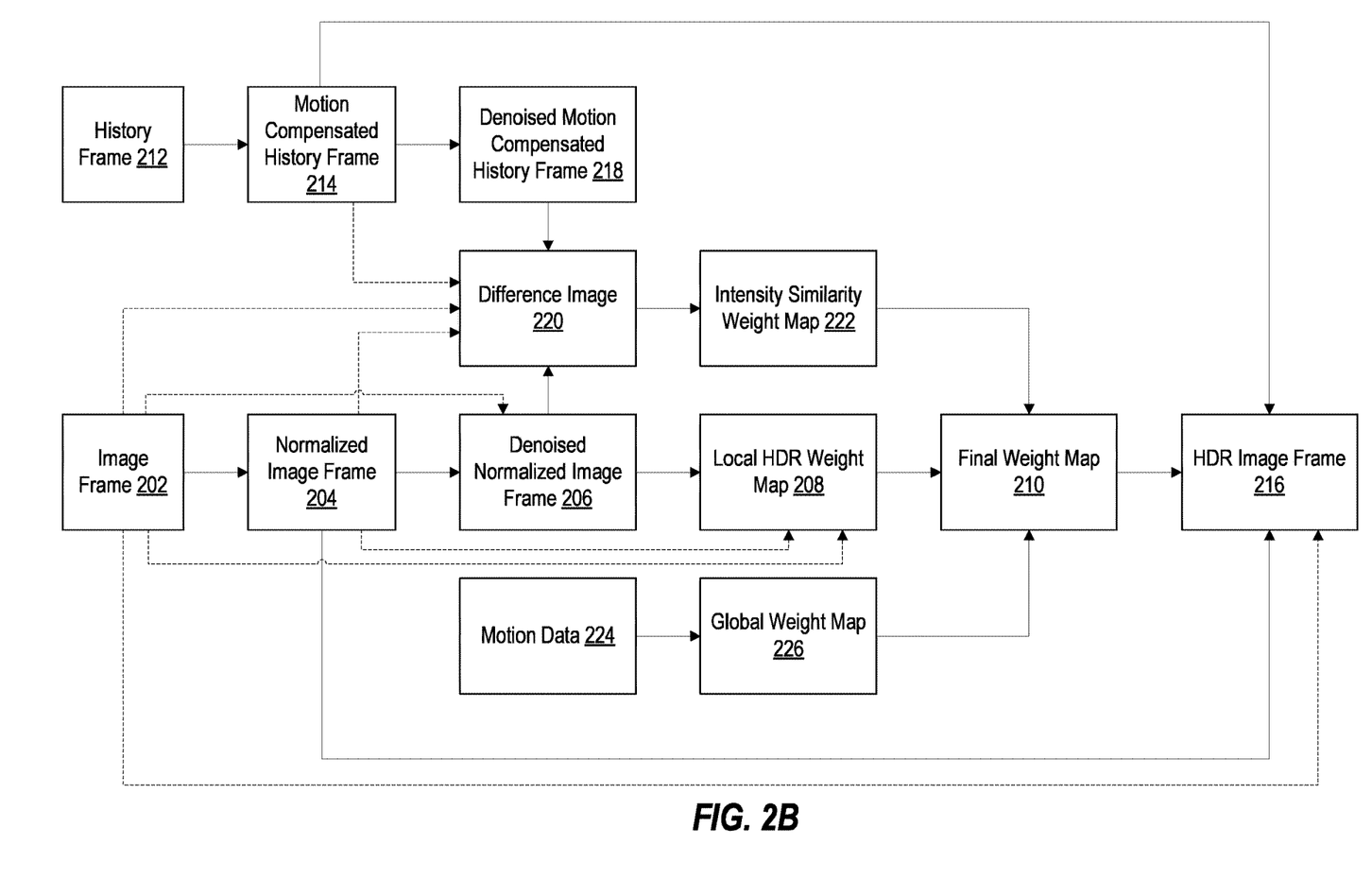
Figure 2C:
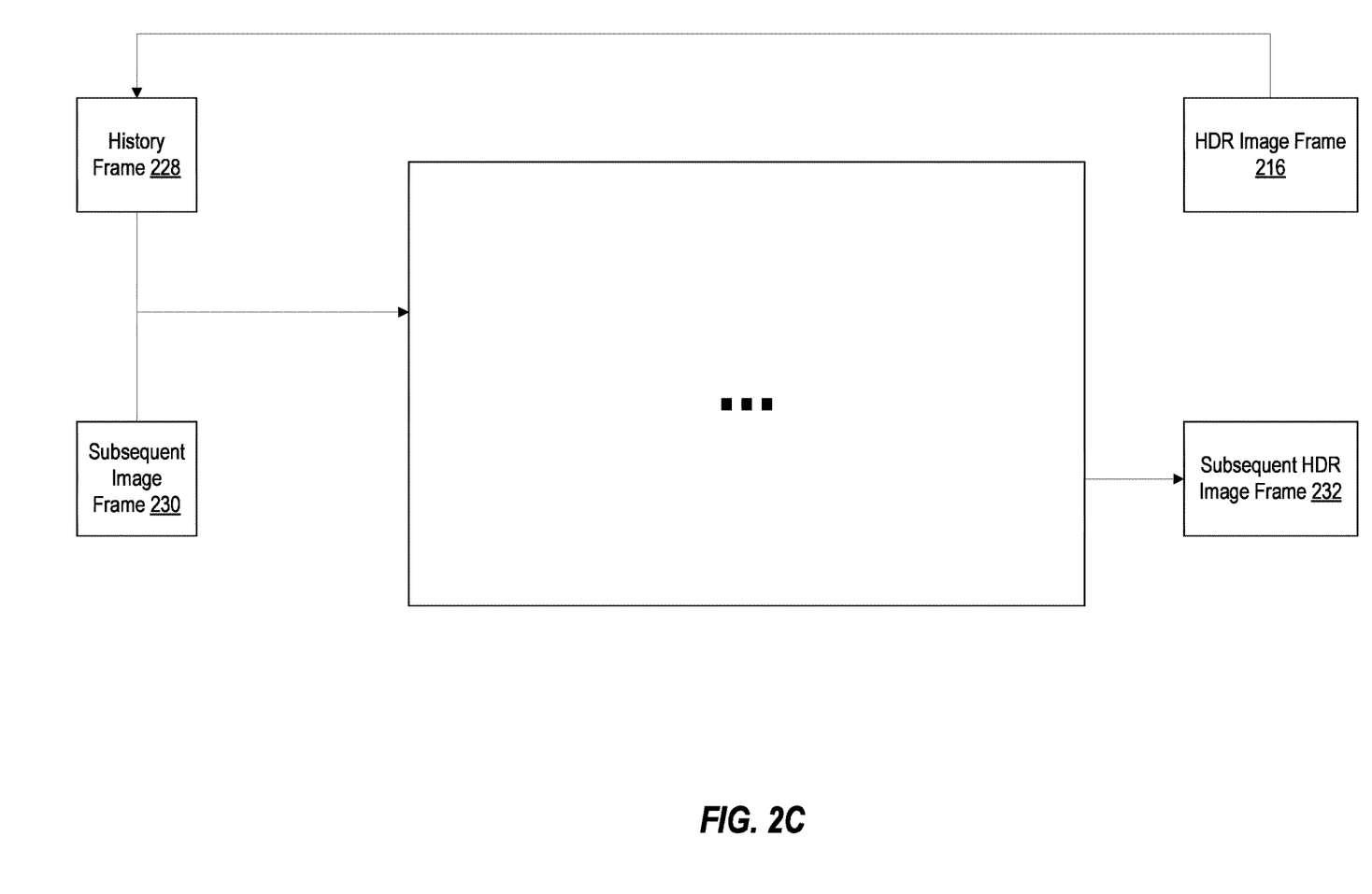

FIGS. 2A through 2C illustrate example image processing flow diagrams depicting image processing associated with HDR image acquisition using temporal filtering. Aspects of the processing depicted in FIGS. 2A, 2B, and 2C may be performed utilizing one or more components of a system (e.g., system 100 of FIG. 1).

FIG. 2A illustrates a captured image frame 202. In at least some implementations, the image frame 202 is captured utilizing an image sensor of a system (e.g., sensor(s) 112 of a system 100, which may be implemented as an HMD 100C). The captured frame 202 may be one of a plurality of consecutively captured image frames captured by the system, each image frame being associated with a respective timepoint. The processing described herein with reference to FIGS. 2A through 2C may be applied, without loss of generality, to any number of consecutively captured image frames to generate HDR imagery (e.g., each consecutively captured image frame, providing output HDR imagery at a same rate as the image capture rate).

The image frame 202 may be captured with a particular set of image capture parameters, which may include a particular exposure time, a particular analog gain, a particular digital gain, etc. In some instances, different sets of image capture parameters are used by a system to capture a plurality of image frames, which may cause consecutively captured image frames to be associated with different sets of image capture parameters (e.g., different exposure times, different gains, etc.).

FIG. 2A also illustrates a history frame 212. As will be described in more detail hereinafter, the history frame 212 may comprise a previously generated HDR image frame that was generated in accordance with the techniques discussed herein (see, for example, FIG. 2C and attendant description). For example, the history frame 212 may be generated based upon a previously captured image frame (e.g., an image frame that was captured at a timepoint that precedes the capture timepoint of the image frame 202 shown in FIG. 2A). In some instances, the previously captured image frame is captured using a different set of image capture parameters (e.g., a different exposure time and/or gain) than the particular set of image capture parameters used to capture the image frame 202 of FIG. 2A. For instance, the image frame 202 may have been captured using a long exposure time, whereas the previously captured image frame may have been captured using a short exposure time, or vice-versa. In this regard, the history frame 212 (generated based on the previously captured image frame) and the image frame 202 may be associated with different sets of image capture parameters, and the history frame may be associated with a capture timepoint that precedes the capture timepoint of the image frame 202.

FIG. 2A illustrates that various processing acts may be performed on the image frame 202 and the history frame 212 to generate an HDR image frame 216. Although FIG. 2A allows the processing acts in a particular order, no ordering is required unless expressly stated or unless performance of one act relies upon completion of another act. One will appreciate, in view of the present disclosure, that some embodiments may omit one or more acts described herein.

The example of FIG. 2A illustrates that a system may generate a normalized image frame 204 based on the captured image frame 202. For example, a normalization operation may be applied to the image frame 202 to generate the normalized image frame 204, and the normalization operation may include scaling pixel values of the image frame 202.

The normalization operation may be performed to cause the image pixels of the normalized image frame 204 to be within the same range as image pixels of the history frame 212 (or motion compensated history frame 214, as will be discussed in more detail hereinafter). In this regard, in some implementations, the normalization operation applied to generate the normalized image frame 204 is selected based on the set of image capture parameters associated with the image frame 202. For instance, where the history frame 212 is associated with a long exposure time and the image frame 202 is associated with a short exposure time, a normalization operation may be selected to cause the image pixel values of the normalized image frame 204 to be within the same range as the image pixel values of the history frame 212. The amount of scaling accomplished by the normalization operation may depend upon a ratio between the long exposure time and the short exposure time. For example, where the long exposure time is 32 times longer than the short exposure time, the image pixel values of the image frame 202 may be scaled by a factor of 32 to generate the normalized image frame 204.

In some implementations, when the image frame 202 is associated with a long exposure time, a different normalization operation may be performed (e.g., scaling by a factor of one, or even refraining from performing normalization, as discussed further with reference to FIG. 2B). In some implementations, short exposure image frames and long exposure image frames are both normalized to an intermediate range of values (e.g., where the long exposure is 32 times longer than the short exposure time, a scale factor of 16 may be used for short exposures, and a scale factor of ½ may be used for long exposures) or another range of values.

In some implementations, the image frame 202 captured by an image sensor is a gamma-corrected image. In some instances, to facilitate accurate scaling of the pixel values of the image frame 202 to bring them into accordance with the pixel values of the history frame 212, a system may remove gamma correction from the image frame 202 prior to performing the normalization operation to generate the normalized image frame 204. In some instances, after scaling the pixel values in accordance with the normalization operation, gamma correction is re-applied to the normalized image (however, the performance of such a step may depend upon whether the history frame comprises a gamma-corrected history frame; a history frame and captured image frame may be used to generate an HDR image frame in radiance space without gamma correction).

In the example of FIG. 2A, a system generates a denoised normalized image frame 206 based upon the normalized image frame 204. A denoised normalized image frame 206 may be generated, in some implementations, by downscaling the normalized image frame 204 to generate a downscaled normalized image frame and then subsequently upscaling the downscaled normalized image. In some instances, downscaling the normalized image frame 204 (or the original image frame 202) reduces the high-frequency noise present in the imagery. For example, downscaling may include using average values of neighborhoods of pixels in the input image as pixel values in the downscaled image, which may operate to smooth out noise. Upscaling may then be performed to preserve the original image size. Various rescaling algorithms are within the scope of the present disclosure, such as nearest-neighbor interpolation, bilinear and/or bicubic techniques, and/or others.

FIG. 2A illustrates that a system may utilize the denoised normalized image frame 206 to generate a local HDR weight map 208 (as will be discussed with reference to FIG. 2B, a normalized image frame 204, or even an image frame 202 may be utilized to generate the local HDR weight map). The local HDR weight map may comprise per-pixel weight values, which may indicate how pixels based on the image frame 202 and pixels based on the history frame 212 should be combined to represent scene information with high dynamic range (e.g., for an HDR image frame 216).

In some implementations, the local HDR weight map 208 is generated by applying one or more intensity thresholds to pixels of the denoised normalized image frame 206 and selecting per-pixel weights for the local HDR weight map 208 based upon whether the corresponding input pixels of the denoised normalized image frame 206 satisfy the one or more intensity thresholds. In some instances, the intensity threshold(s) applied to the pixels of the denoised normalized image frame 206 are selected based upon the set of image capture parameters associated with the capture of the image frame 202. For example, one set of thresholds may be applied for image frames captured with a short exposure time, whereas a different set of thresholds may be applied for image frames captured with a long exposure time.

By way of illustrative, non-limiting example, for 8-bit data with a maximum input pixel value of 255, a threshold value that is at or near the maximum value (e.g., 255, 250, 245, etc.) may be utilized to generate weights of the local HDR weight map 208 for input images associated with a long exposure time. When the threshold value is satisfied by an input pixel, the output pixel in the local HDR weight map 208 may be set to zero. Additional thresholds or ranges of thresholds may be used to provide intermediate weight values. By way of non-limiting example, a threshold range may be defined as pixel values from 220 to 245 such that input pixels within the threshold range receive an interpolated weight value (e.g., a weight of 0.3 for pixel values of 220 and a weight of 0 for pixel values of 245, with interpolated weight values used for pixel values between 220 and 245).

Such operations may cause the local HDR weight map 208 to give less or zero weight to pixels of the input long exposure image that provide saturated or nearly saturated representations of objects in the captured scene.

As another illustrative, non-limiting example, also for 8-bit data, a threshold value of 255 may be utilized for input images associated with a short exposure time. When the threshold value is satisfied by an input pixel, the output pixel in the local HDR weight map 208 may be set to a maximum weight value (e.g., 1). Additional thresholds or ranges of thresholds may be used to provide intermediate weight values. By way of non-limiting example, a threshold range may be defined as pixel values from 128 to 255 such that input pixels within the threshold range receive an interpolated weight value (e.g., a weight of 0 for pixel values of 128 and a weight of 1 for pixel values of 255, with interpolated weight values used for pixels between 128 and 255).

Such operations may cause the local HDR weight map 208 to give high or full weight to pixels of the input short exposure image that capture objects that would appear saturated or nearly saturated if a long exposure time were used instead to capture the input image.

Referring again to FIG. 2A, the local HDR weight map 208 may optionally be combined with other weight maps to form a final weight map 210, as shown in FIG. 2A. Additional details related to other components that may used to form the final weight map 210 will be described in more detail hereinafter.

In the example of FIG. 2A, the HDR image frame 216 may be generated based on the HDR weight map 208 (or the final weight map 210), the motion compensated history frame 214, and the normalized image frame 204. The motion compensated history frame 214 may be obtained, for example, using motion data associated with the system (e.g., obtained utilizing an IMU) at different timepoints. For example, an IMU may obtain first pose data for the system at a first timepoint associated with the history frame 212 (or associated with a previously captured image frame used to generate the history frame) and may obtain second pose data for the system at a second timepoint. The system may use the first and second pose data to reproject or otherwise transform the history frame 212 to generate the motion compensated history frame 214, which may depict the objects represented in the history frame 212 as though they were captured from the second pose (e.g., the same pose from which the image frame 202 was captured). Thus, in some instances, objects represented in both the motion compensated history frame 214 and the normalized image frame 204 may be substantially spatially aligned. This alignment may lead to reduced motion artifacts when combining the motion compensated history frame 214 and the normalized image frame 204 to generate the HDR image frame 216.

The local HDR weight map 208 enables the motion compensated history frame 214 to be used in combination with the image frame 202 (or an image based thereon, such as the normalized image frame 204) to represent scene information with high dynamic range. By utilizing the history frame 212, HDR image frames 216 may be generated using only a single newly captured image frame 202, thereby enabling HDR image acquisition at a rate that can match the image capture rate.

As noted above, and as shown in FIG. 2A, a final weight map 210 may be used to generate the HDR image frame 216, and the final weight map 210 may comprise additional weight components (e.g., aside from the local HDR weight map 208 discussed above). FIG. 2A shows that the final weight map 210 may be further based upon an intensity similarity weight map 222 4 and/or a global weight map 226.

The intensity similarity may be generated based upon a difference image 220. In the example of FIG. 2A, the difference image is computed as a difference between a denoised motion compensated history frame 218 and the denoised normalized image frame 206. The denoised motion compensated history frame 218 may be generated using rescaling techniques discussed hereinabove with reference to the generation of the denoised normalized image frame 206 (instead using the motion compensated history frame 214 as the input image).

The difference image 220 may capture per-pixel differences between the motion compensated history frame 214 and the normalized image frame 204. Such difference may arise, for example, when a high amount of system motion occurs between the capturing of the history frame 212 (or the previously captured image frame upon which the history frame 212 is based) and the capturing of the image frame 202, and/or when there are changes in the captured scene (e.g., moving objects in the scene, changes in state of objects in the scene, etc.). Thus, pixels in the difference image 220 that indicate a large difference value may be assigned a weight value for the intensity similarity weight map 222 that causes additional weight to be given to the normalized image frame 204 when generating the HDR image frame 216 (e.g., giving preference to the more temporally recent representation of the scene).

The global weight map 226 may be generated based upon motion data 224. The motion data 224 may correspond to the motion data discussed above for generating the motion compensated history frame 214. For example, when pose data for the system (e.g., obtained via an IMU) indicates a large amount of motion between the first pose for capturing the history frame 212 (or for capturing the previously captured image frame used to generate the history frame) and the second pose for capturing the image frame 202, the global weight map 226 may be defined as a global weight value that causes additional weight to be given to the normalized image frame 204 when generating the HDR image frame 216 (e.g., giving preference to the more temporally recent representation of the scene).

The final weight map 210 may be generated as a combination of the intensity similarity weight map 222, the local HDR weight map 208, and the global weight map 226. For example, the final weight map 210 may be computed as a per-pixel product of the global weight map 226, the intensity similarity weight map 222, and the local HDR weight map 208.

In the example of FIG. 2A, the HDR image frame 216 may be generated as a per-pixel sum of two terms. The first term may comprise a per-pixel product of the motion compensated history frame 214 and the final weight map 210. The second term may comprise a per-pixel product of the normalized image frame 204 and the complement of the final weight map 210 (e.g., where each pixel is computed as 1 minus the corresponding pixel value of the final weight map 210).

In some instances, the processing shown with reference to FIG. 2A (e.g., normalization) may result in an HDR image frame 216 that includes pixel values that are outside of an acceptable range (e.g., for 8-bit data, within a range of 0 to 255). Accordingly, in some implementations, a tone mapping operation (e.g., applying a logarithmic mapping function) may be performed on the HDR image frame 216 to bring the pixel values thereof into an acceptable range (e.g., 0 to 255 for 8-bit data).

Variations on the particular processing illustrated in FIG. 2A are within the scope of the present disclosure. In one example, FIG. 2B illustrates various dashed lines, which depict alternative processing acts that may be performed to generate an HDR image frame 216. For example, as noted above, normalization may optionally be skipped (or a normalization operation including a scale factor of 1 may be applied) for image frames captured with a long exposure time (e.g., in implementations where short exposure image frames are normalized to correspond to long exposure image frames). Long exposure image frames may be regarded in some instances as already normalized. Furthermore, in some instances, denoising need not be performed on image frames captured with a long exposure time (e.g., because high-frequency noise may be less prevalent in long exposure image frames than for short exposure image frames).

Thus, FIG. 2B illustrates dashed lines extending from the image frame 202 to the denoised normalized image frame 206, the local HDR weight map 208, the difference image 220, and the HDR image frame 216, indicating that the image frame 202 may alternatively be utilized as an input for generating any of the foregoing.

FIG. 2B illustrates a dashed line extending from the motion compensated history frame 214 to the difference image 220, indicating that, in some implementations, the motion compensated history frame 214 (e.g., rather than a denoised motion compensated history frame 218) may be used as an input to generate the difference image 220. Similarly, FIG. 2B illustrates a dashed line extending from the normalized image frame 204 to the difference image, indicating that, in some implementations, the normalized image frame 204 (e.g., rather than the denoised normalized image frame 206) may be used as an input to generate the difference image 220.

FIG. 2B also illustrates a dashed line extending from the normalized image frame 204 to the local HDR weight map 208, indicating that, in some implementations, the normalized image frame (e.g., rather than the denoised normalized image frame 206) may be used as an input to generate the local HDR weight map 208.

FIG. 2C depicts the HDR image frame 216 discussed above with reference to FIGS. 2A and 2B. FIG. 2C illustrates the HDR image frame 216 being defined as a history frame 228 to be used in combination with a subsequent image frame 230 to generate a subsequent HDR image frame 232. The subsequent image frame 230 may be captured at a timepoint that is subsequent to the capture timepoint for the image frame 202 of FIGS. 2A and 2B. For simplicity, the processing discussed hereinabove for using a history frame and a captured image frame to generate an HDR image frame is represented in FIG. 2C by the ellipsis. By utilizing history frames in this manner, the rate of HDR image frame acquisition may match the rate of image capture with an image sensor.

It should be noted that, in some implementations, an intermediate result (e.g., a radiance image) for generating an HDR image frame may be used as a history frame for generating a subsequent HDR image frame.

Although the examples discussed herein focus, in at least some respects, on utilizing two different sets of image capture parameters to a plurality of consecutive image frames, any number of sets of image capture parameters may be utilized in accordance with the present disclosure.

Example Method(s) for HDR Image Acquisition Using Temporal Filtering

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 3:
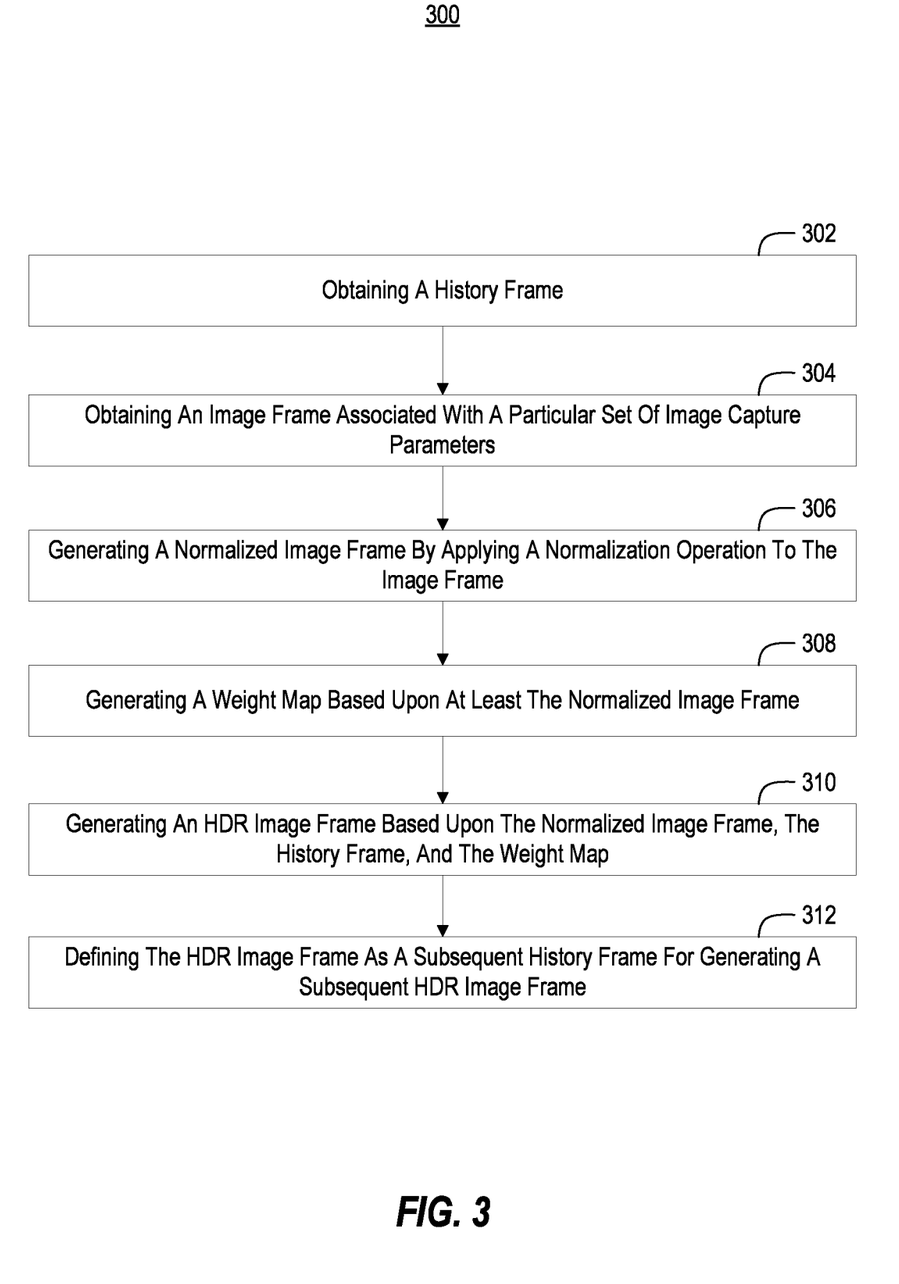
FIG. 3 illustrates an example flow diagram depicting acts associated with generating high dynamic range imagery.

FIG. 3 illustrates an example flow diagram 300 depicting acts associated with generating high dynamic range imagery. The discussion of the various acts represented in the flow diagrams include references to various hardware components described in more detail with reference to FIG. 1.

Act 302 of flow diagram 300 of FIG. 3 includes obtaining a history frame. Act 302 is performed, in some instances, by a system 100 utilizing processor(s) 102, storage 104, sensor(s) 110, I/O system(s) 114, communication system(s) 116, and/or other components. In some instances, the history frame is associated with a first timepoint and with a first set of image capture parameters. The history frame may comprise a previously generated HDR image associated with the first timepoint or an intermediate result used in generating the previously generated HDR image (e.g., a radiance image).

Act 304 of flow diagram 300 includes obtaining an image frame associated with a particular set of image capture parameters. Act 304 is performed, in some instances, by a system 100 utilizing processor(s) 102, storage 104, sensor(s) 110, I/O system(s) 114, communication system(s) 116, and/or other components. In some instances, the image frame is captured at a second timepoint that is subsequent to the first timepoint. The particular set of image capture parameters of the image frame may comprise the first set of image capture parameters (associated with the history frame) or a second set of image capture parameters (different than the first set of image capture parameters.

Act 306 of flow diagram 300 includes generating a normalized image frame by applying a normalization operation to the image frame. Act 306 is performed, in some instances, by a system 100 utilizing processor(s) 102, storage 104, sensor(s) 110, I/O system(s) 114, communication system(s) 116, and/or other components. The normalization operation may be determined based upon the particular set of image capture parameters. In some implementations, the normalization operation includes scaling pixel values of the image frame based on a ratio of a first exposure time (e.g., of the first image capture parameters) to a second exposure time (e.g., of the second image capture parameters). The normalization operation may include removing gamma correction prior to the scaling of the pixel values of the image.

Act 308 of flow diagram 300 includes generating a weight map based upon at least the normalized image frame. Act 308 is performed, in some instances, by a system 100 utilizing processor(s) 102, storage 104, sensor(s) 110, I/O system(s) 114, communication system(s) 116, and/or other components. In some instances, the weight map is generated based upon a local HDR weight map. The local HDR weight map may be generated by applying one or more intensity thresholds to pixels of the image frame, the normalized image frame, a denoised image frame, or a denoised normalized image frame. The intensity threshold(s) may be selected based on the particular set of image capture parameters associated with the image frame. Output pixels of the local HDR weight map may be selected based on whether corresponding pixels of the image frame, the normalized image frame, the denoised image frame, or the denoised normalized image frame satisfy the intensity threshold(s). In some instances, the intensity threshold(s) comprise one or more intensity ranges, and output pixels of the local HDR weight map may comprise interpolated weight values when corresponding pixels of the image frame, the normalized image frame, the denoised image frame, or the denoised normalized image frame fall within the one or more intensity ranges. In some implementations, the denoised image frame is generated by downscaling the image frame to generate a downscaled image frame and upscaling the downscaled image. The denoised normalized image frame may be generated by downscaling the normalized image to generate a downscaled normalized image and upscaling the downscaled normalized image.

In some instances, the weight map is generated further based upon a global weight map. The global weight map may be generated using motion data associated with the system (e.g., assigning a lower global pixel weight when a large amount of motion is detected).

In some instances, the weight map is generated further based upon an intensity similarity weight map. The intensity similarity weight map may be generated based upon a difference image, which may be computed based upon the motion compensated history frame and (i) the image frame or (ii) the normalized image frame.

Act 310 of flow diagram 300 includes generating an HDR image frame based upon the normalized image frame, the history frame, and the weight map. Act 310 is performed, in some instances, by a system 100 utilizing processor(s) 102, storage 104, sensor(s) 110, I/O system(s) 114, communication system(s) 116, and/or other components. In some implementations, a motion compensated history frame is obtained, and the HDR image frame is generated using the motion compensated history frame.

Act 312 of flow diagram 300 includes defining the HDR image frame as a subsequent history frame for generating a subsequent HDR image frame. Act 312 is performed, in some instances, by a system 100 utilizing processor(s) 102, storage 104, sensor(s) 110, I/O system(s) 114, communication system(s) 116, and/or other components.

The acts of flow diagram 300 may be performed iteratively to capture image frames and generate HDR image frames. Consecutive sets of one or more image frames may be captured using at least a first set of image capture parameters and at least a second set of image capture parameters. The different sets of image capture parameters may include different exposure times and/or gains. In some implementations, the rate of generating HDR image frames matches a rate of capturing image frames.

Figure 4:
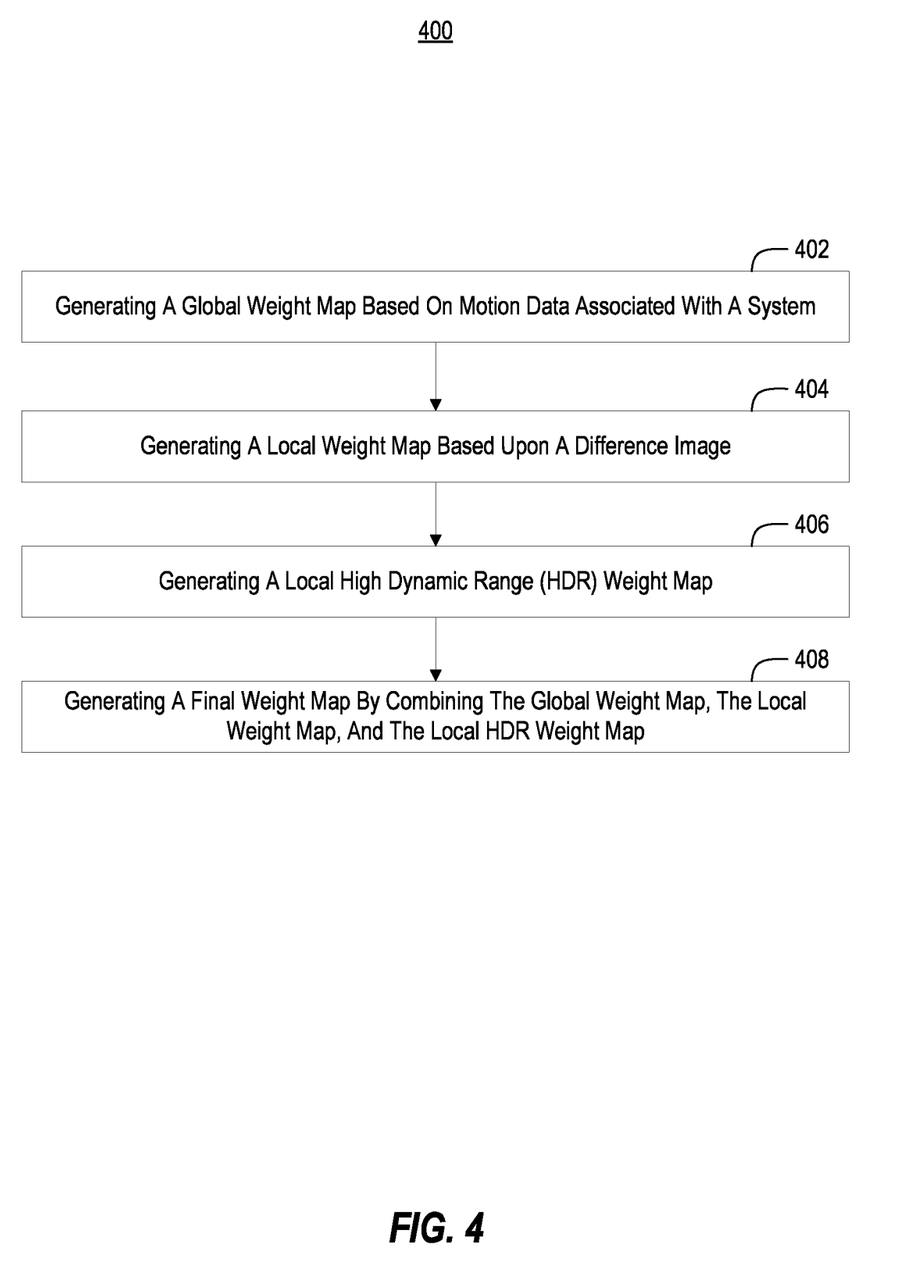
FIG. 4 illustrates an example flow diagram depicting acts associated with generating a weight map.

FIG. 4 illustrates an example flow diagram 400 depicting acts associated with generating a weight map. The discussion of the various acts represented in the flow diagrams include references to various hardware components described in more detail with reference to FIG. 1.

Act 402 of flow diagram 400 of FIG. 4 includes generating a global weight map based on motion data associated with a system. Act 402 is performed, in some instances, by a system 100 utilizing processor(s) 102, storage 104, sensor(s) 110, I/O system(s) 114, communication system(s) 116, and/or other components.

Act 404 of flow diagram 400 includes generating a local weight map based upon a difference image. Act 404 is performed, in some instances, by a system 100 utilizing processor(s) 102, storage 104, sensor(s) 110, I/O system(s) 114, communication system(s) 116, and/or other components. In some instances, the difference image is based upon a motion compensated history frame associated with a first timepoint and (i) an image frame associated with a particular set of image capture parameters and captured at a second timepoint that is subsequent to the first timepoint or (ii) a normalized image frame generated by applying a normalization operation to the image frame. The normalization operation may be determined based upon the particular set of image capture parameters.

Act 406 of flow diagram 400 includes generating a local high dynamic range (HDR) weight map. Act 406 is performed, in some instances, by a system 100 utilizing processor(s) 102, storage 104, sensor(s) 110, I/O system(s) 114, communication system(s) 116, and/or other components. The HDR weight map may be generated based upon the image frame, the normalized image frame, a denoised image frame, or a denoised normalized image frame. The local HDR weight map may be generated by applying one or more intensity thresholds to pixels of the image frame, the normalized image frame, the denoised image frame, or the denoised normalized image frame. The one or more intensity thresholds may be selected based on the particular set of image capture parameters associated with the image frame. Output pixels of the local HDR weight map may be selected based on whether corresponding pixels of the image frame, the normalized image frame, the denoised image frame, or the denoised normalized image frame satisfy the one or more intensity thresholds.

In some instances, the one or more intensity thresholds include one or more intensity ranges. Output pixels of the local HDR weight map may comprise interpolated weight values when corresponding pixels of the image frame, the normalized image frame, the denoised image frame, or the denoised normalized image frame fall within the one or more intensity ranges.

Act 408 of flow diagram 400 includes generating a final weight map by combining the global weight map, the local weight map, and the local HDR weight map. Act 408 is performed, in some instances, by a system 100 utilizing processor(s) 102, storage 104, sensor(s) 110, I/O system(s) 114, communication system(s) 116, and/or other components.

Additional Details Related to Implementing the Disclosed Embodiments

The principles disclosed herein may be implemented in various formats. For example, the various techniques discussed herein may be performed as a method that includes various acts for achieving particular results or benefits. In some instances, the techniques discussed herein are represented in computer-executable instructions that may be stored on one or more hardware storage devices. The computer-executable instructions may be executable by one or more processors to carry out (or to configure a system to carry out) the disclosed techniques. In some embodiments, a system may be configured to send the computer-executable instructions to a remote device to configure the remote device for carrying out the disclosed techniques.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for generating high dynamic range (HDR) imagery, comprising:
   one or more processors; and
   one or more hardware storage devices storing instructions that are executable by the one or more processors to configure the system to:
   obtain a history frame, the history frame being associated with a first timepoint and with a first set of image capture parameters, wherein the history frame comprises a previously generated HDR image associated with the first timepoint;
   obtain an image frame associated with a particular set of image capture parameters, the image frame being captured at a second timepoint that is subsequent to the first timepoint, wherein the particular set of image capture parameters comprises the first set of image capture parameters or a second set of image capture parameters;
   generate a normalized image frame by applying a normalization operation to the image frame, the normalization operation being determined based upon the particular set of image capture parameters;
   generate a weight map based upon at least the normalized image frame; and
   generate an HDR image frame based upon the normalized image frame, the history frame, and the weight map.

2. The system of claim 1, wherein the system further comprises an image sensor, and wherein the image frame is captured using the image sensor.

3. The system of claim 1, wherein the history frame further comprises an intermediate result used in generating the previously generated HDR image.

4. The system of claim 1, wherein the instructions are executable by the one or more processors to further configure the system to define the HDR image frame as a subsequent history frame for generating a subsequent HDR image frame.

5. The system of claim 1, wherein the system is configured to iteratively capture image frames and generate HDR image frames.

6. The system of claim 5, wherein the system is configured to capture image frames using at least the first set of image capture parameters and the second set of image capture parameters, and wherein the first set of image capture parameters includes a first exposure time and a first analog gain, and wherein the second set of image capture parameters includes a second exposure time and/or a second analog gain.

7. The system of claim 6, wherein the normalization operation comprises scaling pixel values of the image frame based on a ratio of the first exposure time to the second exposure time.

8. The system of claim 7, wherein the normalization operation comprises removing gamma correction prior to the scaling of the pixel values of the image.

9. The system of claim 5, wherein a rate of generating HDR image frames matches a rate of capturing image frames.

10. The system of claim 1, wherein:
the instructions are executable by the one or more processors to further configure the system to generate a motion compensated history frame, and
the HDR image frame is generated using the motion compensated history frame.

11. The system of claim 10, wherein the weight map is generated based upon a local HDR weight map.

12. The system of claim 11, wherein the local HDR weight map is generated by applying one or more intensity thresholds to pixels of the image frame, the normalized image frame, a denoised image frame, or a denoised normalized image frame, the one or more intensity thresholds being selected based on the particular set of image capture parameters associated with the image frame, and wherein output pixels of the local HDR weight map are selected based on whether corresponding pixels of the image frame, the normalized image frame, the denoised image frame, or the denoised normalized image frame satisfy the one or more intensity thresholds.

13. The system of claim 12, wherein the one or more intensity thresholds comprise one or more intensity ranges, wherein output pixels of the local HDR weight map comprise interpolated weight values when corresponding pixels of the image frame, the normalized image frame, the denoised image frame, or the denoised normalized image frame fall within the one or more intensity ranges.

14. The system of claim 12, wherein the denoised image frame is generated by downscaling the image frame to generate a downscaled image frame and upscaling the downscaled image, and wherein the denoised normalized image frame is generated by downscaling the normalized image to generate a downscaled normalized image and upscaling the downscaled normalized image.

15. The system of claim 11, wherein the weight map is generated further based upon a global weight map and/or an intensity similarity weight map.

16. The system of claim 15, wherein the global weight map is generated using motion data associated with the system.

17. The system of claim 15, wherein the intensity similarity weight map is generated based upon a difference image, the difference image being computed based upon the motion compensated history frame and (i) the image frame or (ii) the normalized image frame.

18. A system for generating a weight map, comprising:
one or more processors; and
one or more hardware storage devices storing instructions that are executable by the one or more processors to configure the system to:
generate a global weight map based on motion data associated with the system;
generate a local weight map based upon a difference image, the difference image being based upon a motion compensated history frame associated with a first timepoint and (i) an image frame associated with a particular set of image capture parameters and captured at a second timepoint that is subsequent to the first timepoint or (ii) a normalized image frame generated by applying a normalization operation to the image frame;
generate a local high dynamic range (HDR) weight map based upon the image frame, the normalized image frame, a denoised image frame, or a denoised normalized image frame; and
generate a final weight map by combining the global weight map, the local weight map, and the local HDR weight map.

19. The system of claim 18, wherein:
the normalization operation is determined based upon the particular set of image capture parameters,
the local HDR weight map is generated by applying one or more intensity thresholds to pixels of the image frame, the normalized image frame, the denoised image frame, or the denoised normalized image frame,
the one or more intensity thresholds are selected based on the particular set of image capture parameters associated with the image frame, and
output pixels of the local HDR weight map are selected based on whether corresponding pixels of the image frame, the normalized image frame, the denoised image frame, or the denoised normalized image frame satisfy the one or more intensity thresholds.

20. A method for generating high dynamic range (HDR) imagery, comprising:
obtaining a history frame, the history frame being associated with a first timepoint, wherein the history frame comprises an intermediate result used in generating a previously generated HDR image associated with the first timepoint;
obtaining an image frame associated with a particular set of image capture parameters, the image frame being captured at a second timepoint that is subsequent to the first timepoint;
generating a normalized image frame by applying a normalization operation to the image frame, the normalization operation being determined based upon the particular set of image capture parameters;
generating a weight map based upon at least the normalized image frame; and
generating an HDR image frame based upon the normalized image frame, the history frame, and the weight map.

* * * * *